Jan. 24, 1933.  N. M. MARSILIUS  1,895,334
CAM MILLER
Filed Aug. 9, 1929    3 Sheets-Sheet 1

INVENTOR.
Newman M. Marsilius
BY
Chamberlain & Newman
ATTORNEYS.

Jan. 24, 1933.  N. M. MARSILIUS  1,895,334
CAM MILLER
Filed Aug. 9, 1929  3 Sheets-Sheet 2
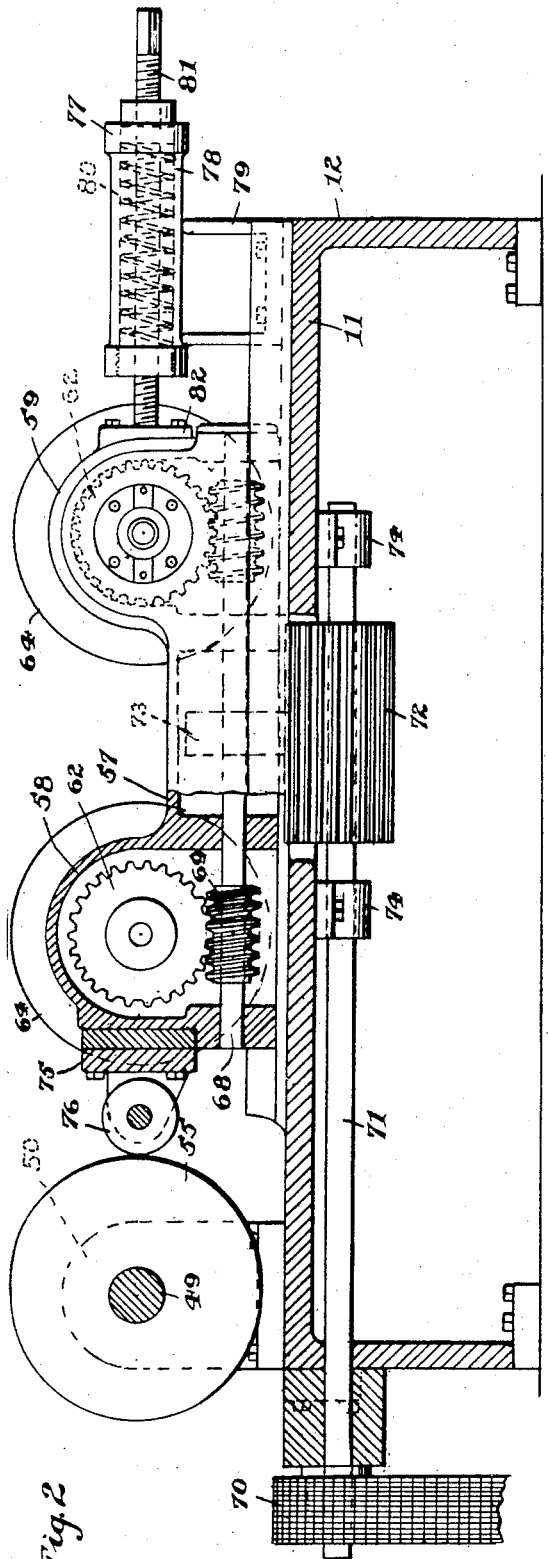
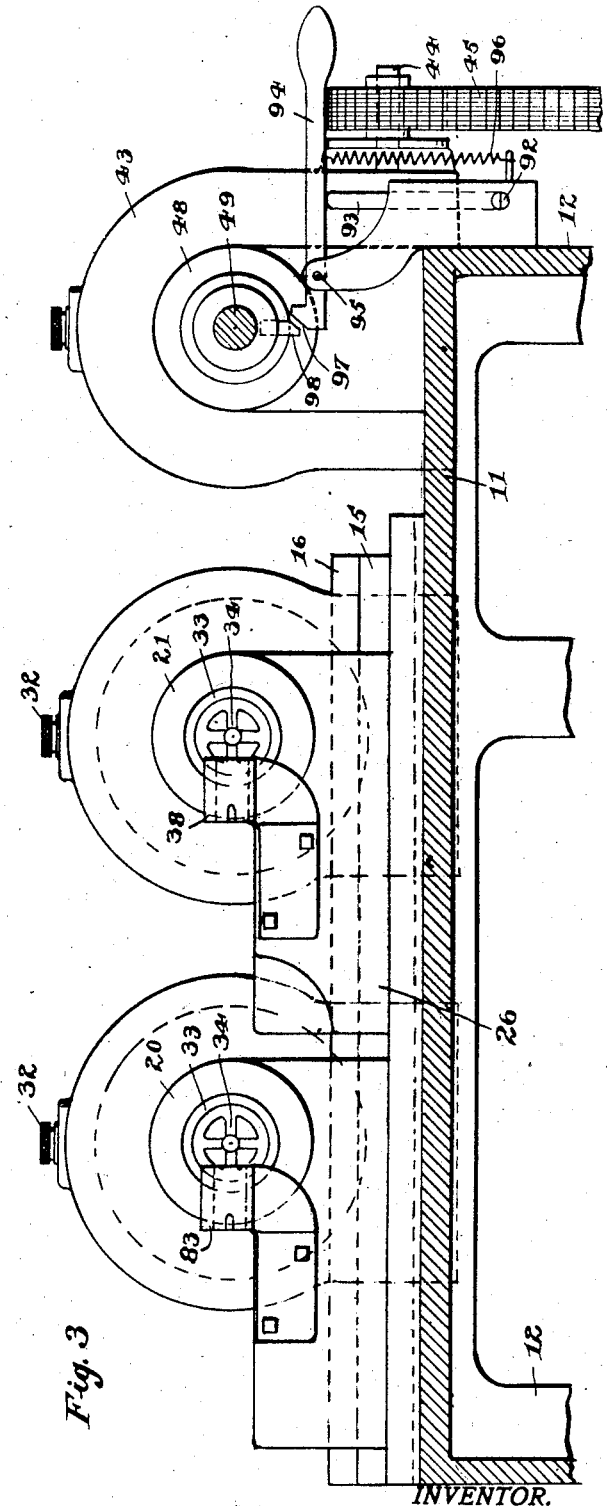
INVENTOR.
Newman M. Marsilius
BY
Chamberlain & Newman
ATTORNEYS.

Jan. 24, 1933.  N. M. MARSILIUS  1,895,334
CAM MILLER
Filed Aug. 9, 1929   3 Sheets-Sheet 3
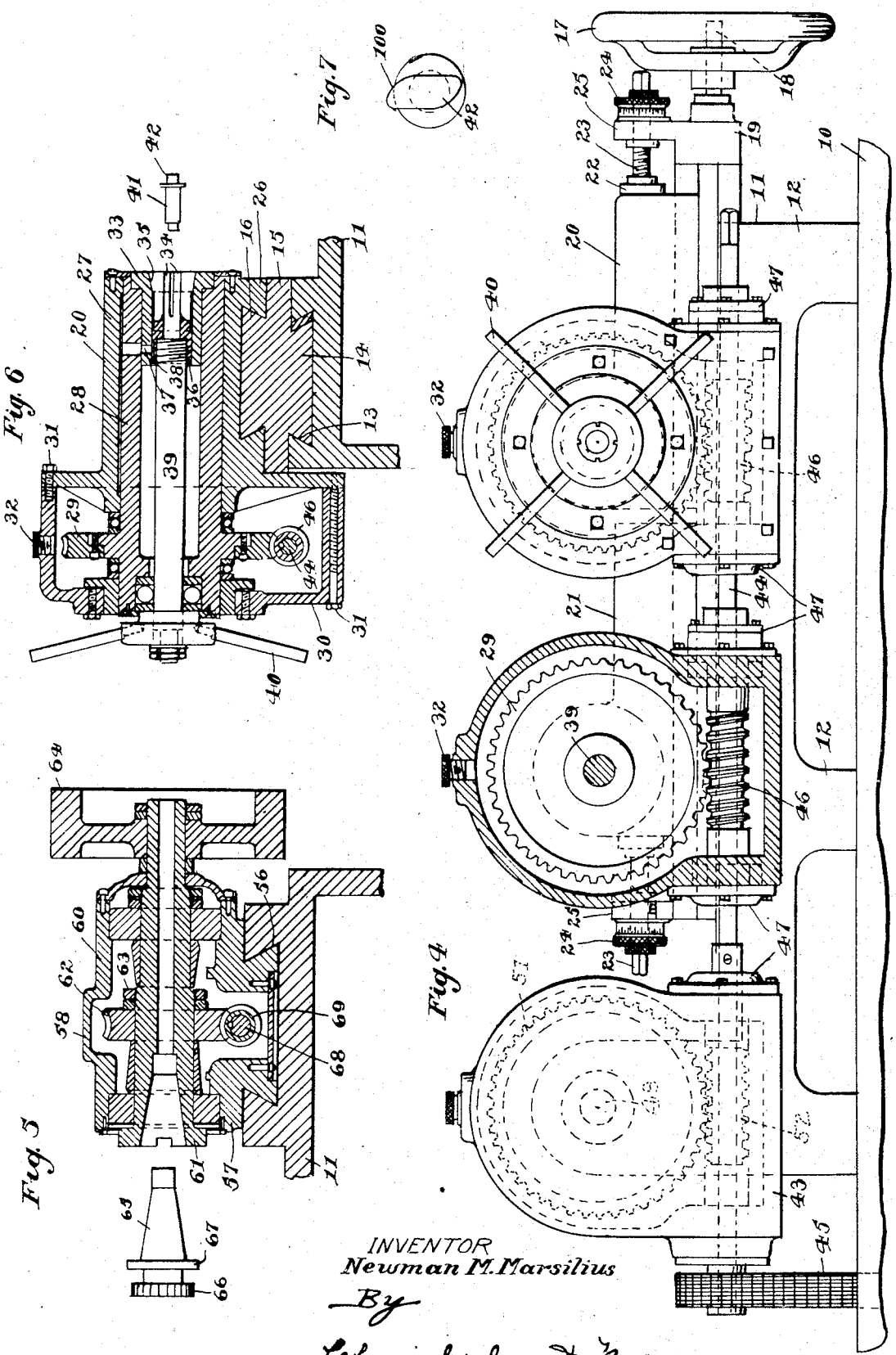
INVENTOR
Newman M. Marsilius
By
Chamberlain & Newman Patented Jan. 24, 1933

1,895,334

UNITED STATES PATENT OFFICE

NEWMAN M. MARSILIUS, OF BRIDGEPORT, CONNECTICUT, ASSIGNOR TO THE PRODUCTO MACHINE COMPANY, OF BRIDGEPORT, CONNECTICUT, A CORPORATION OF CONNECTICUT

CAM MILLER

Application filed August 9, 1929. Serial No. 384,627.

This invention relates to new and useful improvements in milling machines and an object of the invention is to provide an automatic milling machine particularly adapted for operating on irregular surfaces and adapted for operating on a plurality of pieces of work simultaneously.

A further object is to provide a milling machine including a plurality of work carriers adapted for adjustment together and independently along the bed of the machine.

An additional object is to provide an automatic milling machine including a plurality of tool holders and a plurality of work holders being adjustable together and independently, and the tool holders being adjustable toward and from the work holders.

A further object is to provide a milling machine including means for automatically stopping the machine after each complete milling operation.

An additional object is to provide a milling machine including rotary work holders and a reciprocatory carriage for the tool holders, the carriage and work holders being driven from the same driven member; a clutch being interposed in the driving line and means being provided to disconnect said clutch and stop said drive after each complete milling operation.

Additional objects and advantages will become apparent from a consideration of the following detailed description taken in connection with the accompanying drawings. However, it is to be understood that this description and the accompanying drawings are for the purpose of disclosing a satisfactory embodiment of the invention and that references must be had to the appended claims for a definition of the limitations of the invention.

In the drawings:—

Fig. 2 is a sectional view on the line 2—2 of Fig. 1;

Fig. 3 is a sectional view on the line 3—3 of Fig. 1;

Fig. 4 is a sectional view on the line 4—4 of Fig. 1;

Fig. 5 is a central sectional view through a tool holder;

Fig. 6 is a similar view through a work holder; and

Fig. 7 is a face view of a cam on which the machine is adapted to operate and showing an irregular surface.

Figure 1:
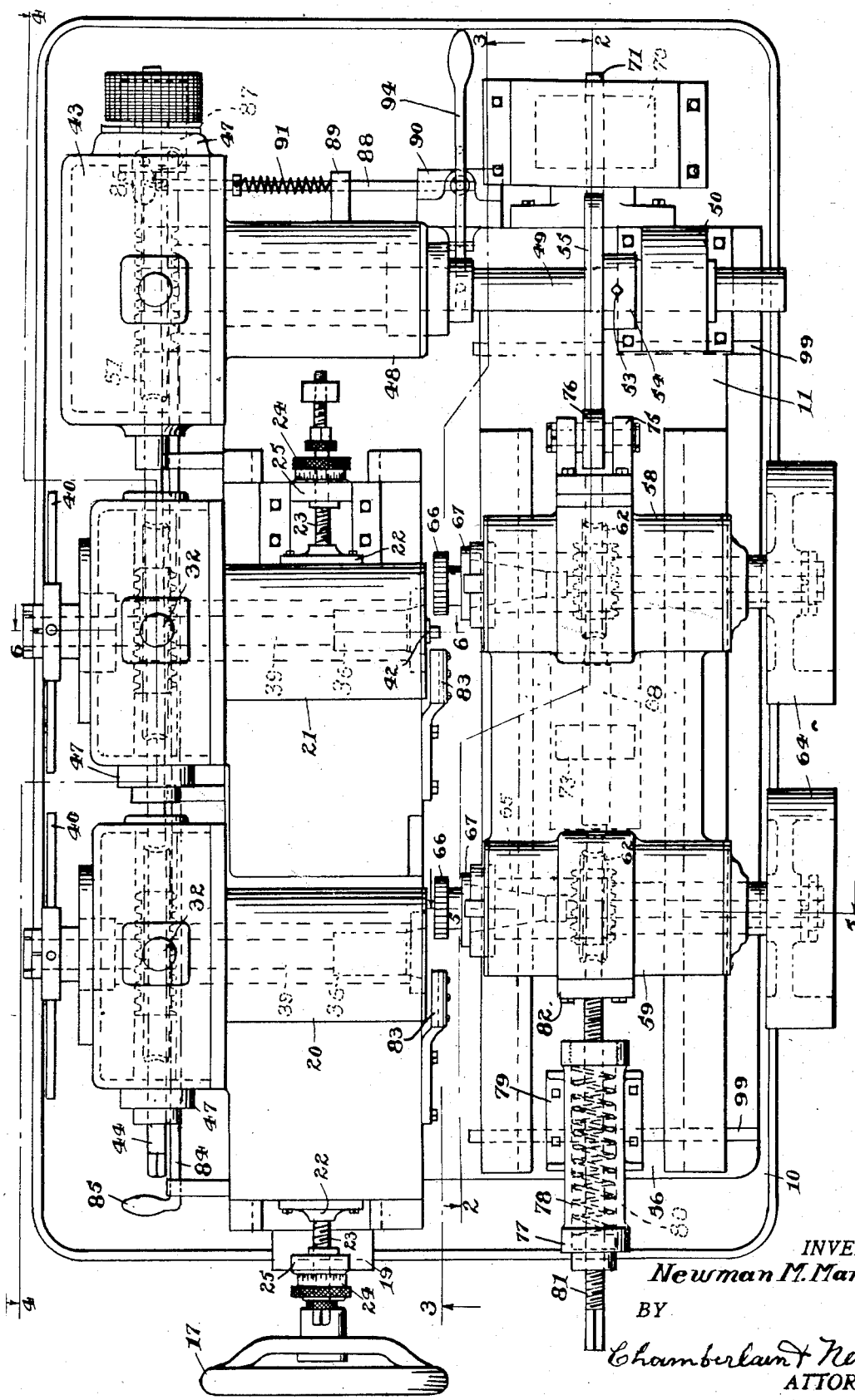
Fig. 1 is a top plan view of the complete machine.

Referring in detail to the drawings, at 10 is shown the upper portion of a bench or other support on which is disposed a bed 11, supported above the bench as by short legs 12. Bed 11 is provided with a guide way 13 into which fits the lower portion 14 of a guide block 15, the block having an upper guide portion 16 similar to its lower portion 14. A hand wheel 17 operating a screw 18 through the nut or bracket 19 on the end of the bed 11 serves to move the guide block 15 in the guide way 13.

Mounted on the upper portion 16 of guide block 15 is shown a pair of work holders 20 and 21 on the opposite ends of which are secured brackets 22 with which co-operate screws 23 of a micrometer adjusting gauges 24, the gauge for work holder 20 operating through the upper portion of nut or bracket 19 while the gauge for work holder 21 operates through a nut or bracket 25 at the opposite end of the bed 11.

The work holders 20 and 21 are similar in construction, and Fig. 6 is a sectional view of the work holder 20. As shown, these parts include a base portion 26 suitably shaped on its underside to receive the upper portion 16 of guide block 15. Further, the work holders include a bearing or housing portion 27 in which is mounted a rotatable sleeve 28 having a worm gear 29 secured thereto. The gear is enclosed by the housing 27 and a cover or end piece 30 secured to the housing as by screws 31. Suitable ball races are provided and access for greasing is given by removal of plug 32.

Within the rotatable sleeve 28 is disposed a portion 33 of a chuck including yielding fingers 34 having inclined surfaces 35 for co-operation with similar adjacent faces of the part 33. At their inner ends the fingers 34 are carried by a head 36, the sleeve 28, part 33 and head 36 being connected for rotation as a unit by pin 37. The head 36 has a slot 38 whereby the head may be moved longitudinally of the sleeve, and the inner end of a rod 39 is threaded to the head as clearly shown in Fig. 6. It will now be obvious that through rotation of hand piece 40, rod 39 will likewise be rotated to move the fingers 34 to either have them grip the work, as per example the shank 41 of cam 42, or to release the same.

Extending longitudinally of the bed 11 and having bearings in the heads or closures 30 as well as in a casing 43 (the purpose of which will later be described) is a shaft 44 driven from below by a belt 45 and having worms 46 meshing with and driving the worm gears 29. The bearings for shaft 44 are indicated at 47.

The casing 43 is mounted on the bed 11 adjacent the driven end of shaft 44 and includes a bearing portion 48. A shaft 49 extends through this bearing portion and also is mounted in a bearing 50, the shaft within the casing 43 having a worm gear 51 meshing with and driven by a worm 52 on shaft 44.

Mounted on shaft 44, as by a screw 53 passing through its hub portion 54, is a cam 55. Disposed in a guide-way 56 in the bed 11, is a reciprocal carriage 57 on which is mounted a pair of tool holders 58 and 59. The tool holders, a sectional view of one of which is shown in Fig. 5, each comprise a housing 60 secured to the carriage 57. A sleeve or hollow shaft 61 is mounted in bearings in the housing or casing 60 and is secured to a worm gear 62 held in place on the sleeve as by collars 63. To the outer end of shaft 61 is secured a fly or balance wheel 64 and at its inner end the shaft is hollowed out to provide a conical seat for the conical shank 65 of a tool 66. This tool 66 is also provided with a shoulder 67 adapted to bear against the end of the shaft 61 when the tool is in place.

For the purpose of driving the tools, a shaft 68 extends through the carriage 57, and has bearings in the carriage. This shaft carries worms 69 meshing with worm gears 62. A pulley 70 at one end of a shaft 71 is driven from below by a belt to impart movement to the shaft which in turn and through the medium of a gear 72 (see Fig. 2) serves to drive a gear 73 on shaft 68. It will be noted that gear 72 is of considerable width and accordingly will remain in mesh with gear 73 when the carriage is reciprocated in the guide-way 56. Shaft 71 is mounted in bearings 74 on the underside of the bed.

Mounted in a bracket 75 at one end of carriage 57 is a roller 76 adapted to be engaged by cam 55 to slide the carriage. At the oposite end of the carriage and mounted on the bed 11 is a spring means 77 adapted to maintain the roller in contact with the cam. This spring means comprises a cylinder 78 mounted by a bracket 79 and within which is disposed a strong coil spring 80. Spring 80 surrounds a threaded shaft 81 bearing against a plate 82 on the carriage. The tendency of the spring 80 is to project the shaft 81 toward the carriage and maintain the roller in contact with the cam. From this it will be seen that the cam moves the carriage in one direction and the spring moves it in the other. Actually the cam moves the tools against the work and the spring returns the tools to normal position clear of the work. The work holders each are provided with a bracket 83 adjacent the chucks to facilitate the positioning of the work.

Automatic trip means are provided for stopping the machine each time the cam 55 makes a complete revolution. To this end a slide rod 84 is disposed at one side of the bed and at one end is provided with an operating handle 85 while at its other end it is connected to one arm of a bell crank lever 86. Bell crank 86 is connected to operate a clutch 87 for connecting and disconnecting the pulley or sprocket 45 with the shaft 44.

Further, a trip rod 88 is connected with an arm of the bell crank 86 and is mounted to slide in bearings 89 and a bracket 90 secured to one end of the bed 11. A spring 91 surrounds the rod 88 and serves to normally hold the rod and clutch in engagement when not prevented by a means now to be described. Trip rod 88 is provided with a notch 92 engaged by a pin 93 mounted for vertical sliding movement in the bracket 90. To operate this pin a trigger lever 94 is pivoted to bracket 90 as at 95 and has its handle portion normally maintained down upon the pin by a coil spring 96. The other end of lever 94 is provided with an inclined or beveled head 97 engaged by a pin 98 on shaft 49.

It will be obvious that this mechanism serves to trip and stop the machine with each complete rotation of the cam shaft 49. The machine is again started by operating slide rod 84 through its handle 85.

From the foregoing it will be apparent that the work holders 20 and 21 are adjustable independently and as a unit. Further, the carriage 57 may be adjusted laterally of the bed, that is, toward and from the work holders, on the guides 99. The machine as shown is adapted for milling the irregular face 100 of the cam shown in Fig. 7.

Having thus described my invention, what I claim and desire to secure by Letters Patent:

1. In a milling machine, a bed having a guide-way, a guide block operatable in said guide-way, adjusting means for the guide block, a pair of work holders movably mounted upon the guide block and each including a bearing, a sleeve rotatably mounted in each of said bearings, chucking means within each sleeve to hold the work, a worm and worm gear drive for rotating each of said sleeves and work carried therein, a second guide-way on said bed, a pair of reciprocatory carriages mounted on the bed in said second guide-way and adapted to be operated in a plane parallel to the plane of movement of the guide block, a pair of cooperating cutter spindles adapted to be moved toward and from the axis of the work spindle, worm and worm gear connections for driving the cutter spindles, and means for reciprocating the carriages and thereby the cutter spindles, to and from the work holders during the rotation of the work.

2. In a milling machine, a bed having a pair of parallel guide-ways, a guide block in one of said guide-ways, adjusting means for the guide block, a pair of work holders movable on the guide block and movable thereon and each including a work holdering chuck, a carriage on the other of said guide-ways and reciprocable therein in a plane parallel with the plane of movement of the guide block and work holders and with respect thereto, means to reciprocate said carriage, a pair of cooperating cutter spindles mounted for rotation in bearings on the carriage, and worm and worm gear connections with said spindles for driving the same as the carriage and cutters are reciprocated with respect to the work in the holders.

3. In a milling machine, a bed having guide-ways, a guide block slidably mounted in said guide-ways, means for adjusting the guide block in said ways, a work holder adjustably mounted upon and longitudinally of the guide block, said work holder including a bearing and housing, a sleeve rotatably mounted in the bearing crosswise of said guide block, a worm gear upon the sleeve, a shaft extending through said housing, a worm keyed to slide upon said shaft within the housing and meshing with said worm gear so as to be movable with it and the housing, a chuck in one end of the sleeve to hold work pieces, a chuck-operating means extending longitudinally into the sleeve in engagement with the chuck whereby it may be operated from the outer end of the sleeve.

4. In a milling machine, a bed having guide-ways, a guide block slidably mounted in said guide-ways, work holders adjustably mounted upon and longitudinally of the guide block, means for adjusting the holders longitudinally upon the guide block and with respect to each other, means for adjusting the guide block to move the holders together upon the bed, said work holders each including a bearing, housing and a sleeve rotatably mounted therein crosswise of the slide block, a worm gear upon each sleeve, a shaft extending through said housings, worms upon said shaft meshing with said worm gears, a chuck in one end of each sleeve to hold the work, a chuck-operating shaft extending longitudinally into each sleeve in engagement with the chucks whereby they may be operated from the chuck end of the sleeves, and means for operating the shaft to simultaneously drive the two gear trains and work holders.

Signed at Bridgeport in the county of Fairfield and State of Connecticut this 31st day of July, A. D. 1929.

NEWMAN M. MARSILIUS.